United States Patent
Sun et al.

(10) Patent No.: US 10,615,976 B2
(45) Date of Patent: Apr. 7, 2020

(54) LIGHTWEIGHT KEY MANAGEMENT SYSTEM FOR MULTI-TENANT CLOUD ENVIRONMENT

(71) Applicant: SAP SE, Walldorf (DE)

(72) Inventors: Xun Sun, Shanghai (CN); Yu Wu, San Francisco, CA (US); Xiaoxiao Gu, Shanghai (CN)

(73) Assignee: SAP SE, Walldorf (DE)

( * ) Notice: Subject to any disclaimer, the term of this patent is extended or adjusted under 35 U.S.C. 154(b) by 273 days.

(21) Appl. No.: 15/903,655

(22) Filed: Feb. 23, 2018

(65) Prior Publication Data

US 2019/0268148 A1    Aug. 29, 2019

(51) Int. Cl.
| | | |
|---|---|---|
| *H04L 29/00* | (2006.01) | |
| *H04L 9/08* | (2006.01) | |
| *H04L 9/14* | (2006.01) | |
| *H04L 9/32* | (2006.01) | |
| *H04L 9/06* | (2006.01) | |

(52) U.S. Cl.
CPC .......... *H04L 9/0869* (2013.01); *H04L 9/0643* (2013.01); *H04L 9/14* (2013.01); *H04L 9/3242* (2013.01); *H04L 9/3247* (2013.01)

(58) Field of Classification Search
CPC ....... H04L 9/0869; H04L 9/14; H04L 9/3247; H04L 9/0643; H04L 9/3242; H04L 9/302; H04L 9/321; H04L 9/088; H04L 9/0891; H04L 9/0866
See application file for complete search history.

(56) References Cited

U.S. PATENT DOCUMENTS

| | | | | |
|---|---|---|---|---|
| 8,719,590 | B1* | 5/2014 | Faibish | H04L 9/085 |
| | | | | 713/190 |
| 9,866,392 | B1* | 1/2018 | Campagna | H04L 9/3247 |
| 2004/0034771 | A1* | 2/2004 | Edgett | G06F 21/31 |
| | | | | 713/168 |
| 2013/0163764 | A1* | 6/2013 | van den Berg | H04L 9/0822 |
| | | | | 380/278 |
| 2015/0007263 | A1* | 1/2015 | Stewart | H04L 63/08 |
| | | | | 726/3 |
| 2017/0012952 | A1* | 1/2017 | Cocchi | H04L 9/3263 |
| 2017/0171219 | A1* | 6/2017 | Campagna | H04L 63/123 |
| 2017/0244693 | A1* | 8/2017 | Papadopoulos | H04L 63/061 |
| 2018/0062835 | A1* | 3/2018 | Hamel | H04L 9/0822 |
| 2018/0219674 | A1* | 8/2018 | Mullins | H04L 63/0478 |
| 2019/0007208 | A1* | 1/2019 | Surla | H04L 9/0891 |
| 2019/0097800 | A1* | 3/2019 | Melrose | G16H 10/60 |

OTHER PUBLICATIONS

Aulbach et al., "Extensibility and Data Sharing in evolving multi-tenant databases", 2011 IEEE 27th International Conference on Data Engineering, Date of Conference: Apr. 11-16 (Year: 2011).*

* cited by examiner

*Primary Examiner* — Morshed Mehedi
(74) *Attorney, Agent, or Firm* — Buckley, Maschoff & Talwalkar LLC (57) ABSTRACT

A method includes generating a root key pair including a public key and a private key, generating metadata for keys associated with a tenant, wherein the metadata includes a key tag, a key version, and a tenant identifier, deriving a tenant key from the root key pair and the metadata, and outputting the tenant key.

20 Claims, 6 Drawing Sheets

LIGHTWEIGHT KEY MANAGEMENT SYSTEM FOR MULTI-TENANT CLOUD ENVIRONMENT

BACKGROUND

Nearly every organization acquires, processes, and stores highly-sensitive information. Among this information is confidential information such as personally identifiable information (PII) and business secrets. Organizations are expected to closely guard this sensitive information and manage access appropriately.

One challenge which arises when implementing cloud storage services is ensuring data confidentiality of cryptographic objects (e.g., cryptographic keys) and sensitive information. This challenge is commonly addressed via data encryption. Data encryption achieves confidentiality by translating information from its original form (plaintext) into an encoded, unintelligible form (ciphertext), which can only be decoded by an intended recipient.

A key management system (KMS), also known as a cryptographic key management system (CKMS), is a critical component of a robust encryption architecture. The KMS is involved with the generation, storage, distribution, import, and management of cryptographic keys for devices and applications. The keys in the KMS are the secret pieces of information that can be used for cryptographic operations such as signing messages or encrypting information. Therefore, a KMS that securely manages the lifecycle of keys is an important and integral part of a modern information technology (IT) system.

Existing KMS products are not tailored for multi-tenant cloud environments, require expensive hardware resources to run, and entail significant maintenance and operation overhead.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The disclosed embodiments relate to a lightweight key management system suitable for a multi-tenant cloud environment. The environments described herein are merely exemplary, and it is contemplated that the techniques described may be extended to other implementation contexts.

The key management system discussed herein can provide one or more advantages including the ability to be multi-tenant secure by generating different keys for different tenants on-the-fly without having to persist these keys. Since keys are not persisted, another potential advantage can include significantly-reduced storage overhead as compared to traditional KMS implementations, and a minimized attack surface regardless of how many keys are generated. Yet another advantage of the key management system can include the ability to run with minimal hardware and software resources compared to conventional KMS products.

One or more embodiments that include one or more of the advantages discussed are described in detail below with reference to the figures.

Figure 1:
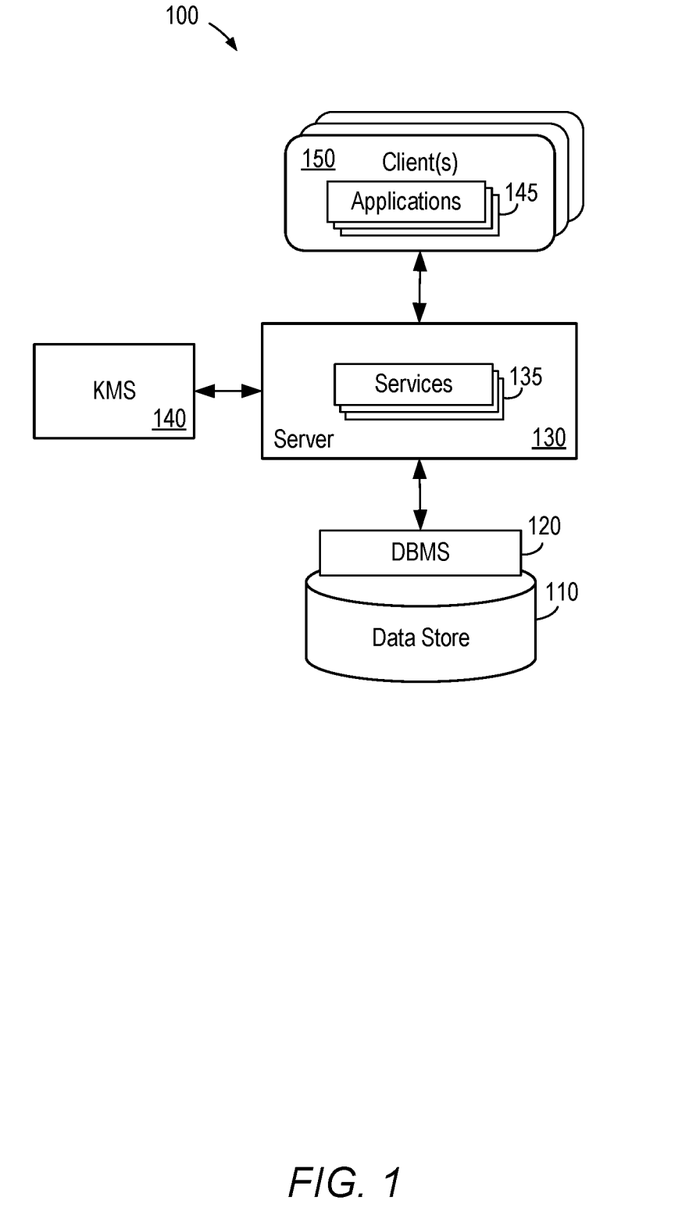
FIG. 1 is a block diagram of an overall system architecture according to some embodiments.

FIG. 1 is a block diagram of an overall system architecture 100 according to some embodiments. Embodiments are not limited to architecture 100 or to a database architecture.

Architecture 100 includes data store 110, database management system (DBMS) 120, server 130, key management system (KMS) 140, and client(s) 150. Generally, services 135 executing within server 130 receive requests (e.g., queries) from applications executing on client(s) 150 and provides results to applications 145 based on data stored within data store 110. The client 150 may include any type of computing device such as a laptop, a tablet, a mobile phone, an appliance, a desktop computer, and the like.

More specifically, server 130 may execute and provide services 135 to applications 145. Services 135 may comprise server-side executable program code (e.g., compiled code, scripts, etc.) which provide functionality to applications 145 by providing user interfaces (e.g., in eXtended Markup Language (XML), HyperText Markup Language (HTML) and/or JavaScript) to client(s) 150, receiving requests from applications 145, retrieving data from data store 110 based on the requests, processing the data received from data store 110, and providing the processed data to applications 145. Services 135 may be made available for execution by server 130 via registration and/or other procedures which are known in the art.

In one specific example, a client 150 executes an application 145 to present a user interface to a user on a display of the client 150. The user operates the user interface to request certain data, and the application 145 passes a query based on the request to one of services 135. An SQL script is generated based on the query and forwarded to DBMS 120. DBMS 120 executes the SQL script to return a result set based on data of data store 110, and the application 145 generates and displays a report/visualization based on the result set.

The above operation may leverage a set of objects defined by metadata stored within data store 110 and/or a separate metadata repository (not shown). The metadata is used to execute the query with respect to the corresponding physical entities (e.g., a physical database table, associated columns of one or more database tables, etc.) of data store 110.

Server 130 provides any suitable protocol interfaces through which applications 145 executing on client(s) 150 may communicate with services 135 executing on application server 130. For example, server 130 may include a HyperText Transfer Protocol (HTTP) interface supporting a transient request/response protocol over Transmission Control Protocol (TCP), and/or a WebSocket interface supporting non-transient full-duplex communications between server 130 and any client(s) 150 which implement the WebSocket protocol over a single TCP connection.

One or more services 135 executing on server 130 may communicate with DBMS 120 using database management interfaces such as, but not limited to, Open Database Connectivity (ODBC) and Java Database Connectivity (JDBC) interfaces. These types of services 135 may use Structured Query Language (SQL) to manage and query data stored in data store 110.

DBMS 120 serves requests to query, retrieve, create, modify (update), and/or delete data of data store 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Server 130 may be separated from or closely integrated with DBMS 120. A closely-integrated server 130 may enable execution of services 135 completely on the database platform, without the need for an additional server. For example, according to some embodiments, server 130 provides a comprehensive set of embedded services which provide end-to-end support for Web-based applications. The services may include a lightweight web server, configurable support for Open Data Protocol, server-side JavaScript execution and access to SQL and SQLScript.

Data store 110 may comprise any query-responsive data source or sources that are or become known, including but not limited to a structured-query language (SQL) relational database management system. Data store 110 may comprise a relational database, a multi-dimensional database, an eXtendable Markup Language (XML) document, or any other data storage system storing structured and/or unstructured data. The data of data store 110 may be distributed among several relational databases, dimensional databases, and/or other data sources. Embodiments are not limited to any number or types of data sources.

In some embodiments, the data of data store 110 may comprise one or more of conventional tabular data, row-based data, column-based data, and object-based data. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another.

Data store 110 may implement an in-memory database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Each of clients 150 may comprise one or more devices executing program code of an application 145 for presenting user interfaces to allow interaction with application server 130. The user interfaces of applications 145 may comprise user interfaces suited for reporting, data analysis, and/or any other functions based on the data of data store 110.

KMS 140 manages the lifecycle of keys used in the system. For example, data store 110 stores data, application server 130 runs the business logic and makes sense of data, and KMS 110 securely manages encryption keys for encryption and decryption. A data encryption service may use keys maintained by KMS 140 to perform data encryption/decryption. KMS 140 may be separate from or integrated in server 130.

Figure 2:
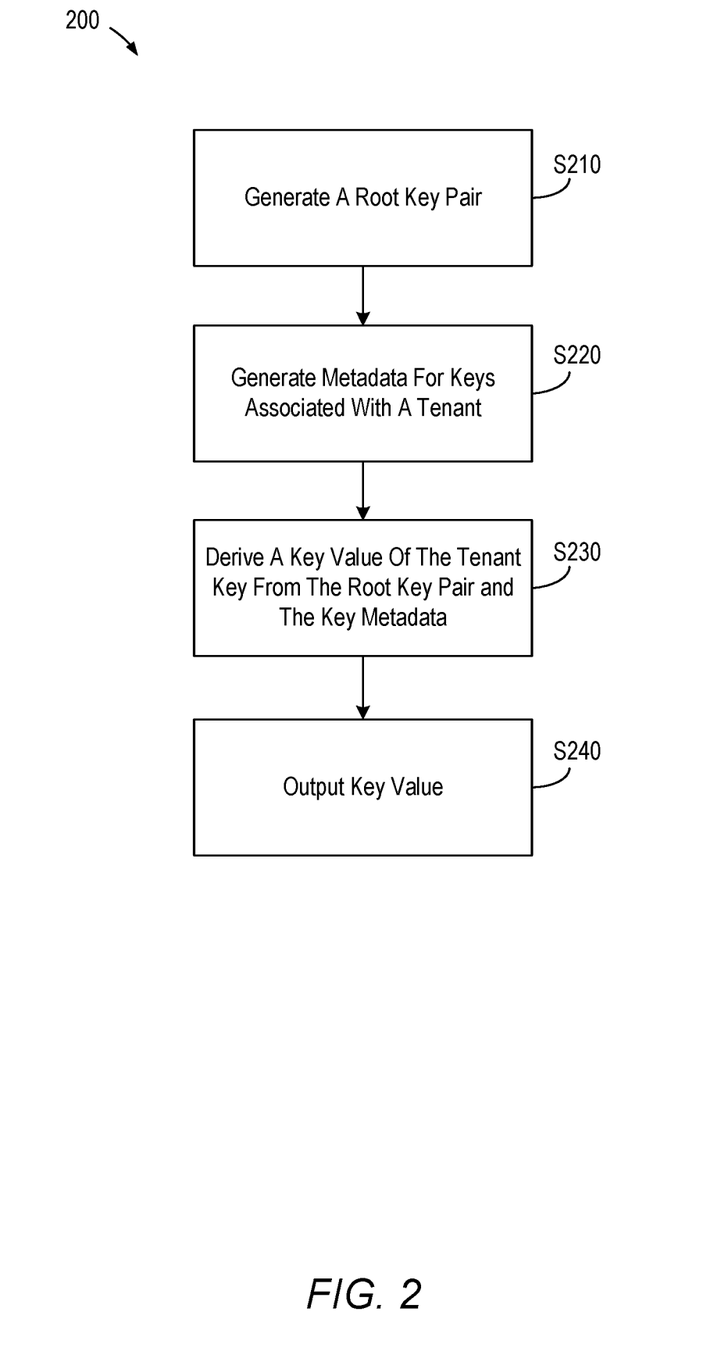
FIG. 2 is a flow diagram illustrating an exemplary process according to some embodiments.
Figure 3:
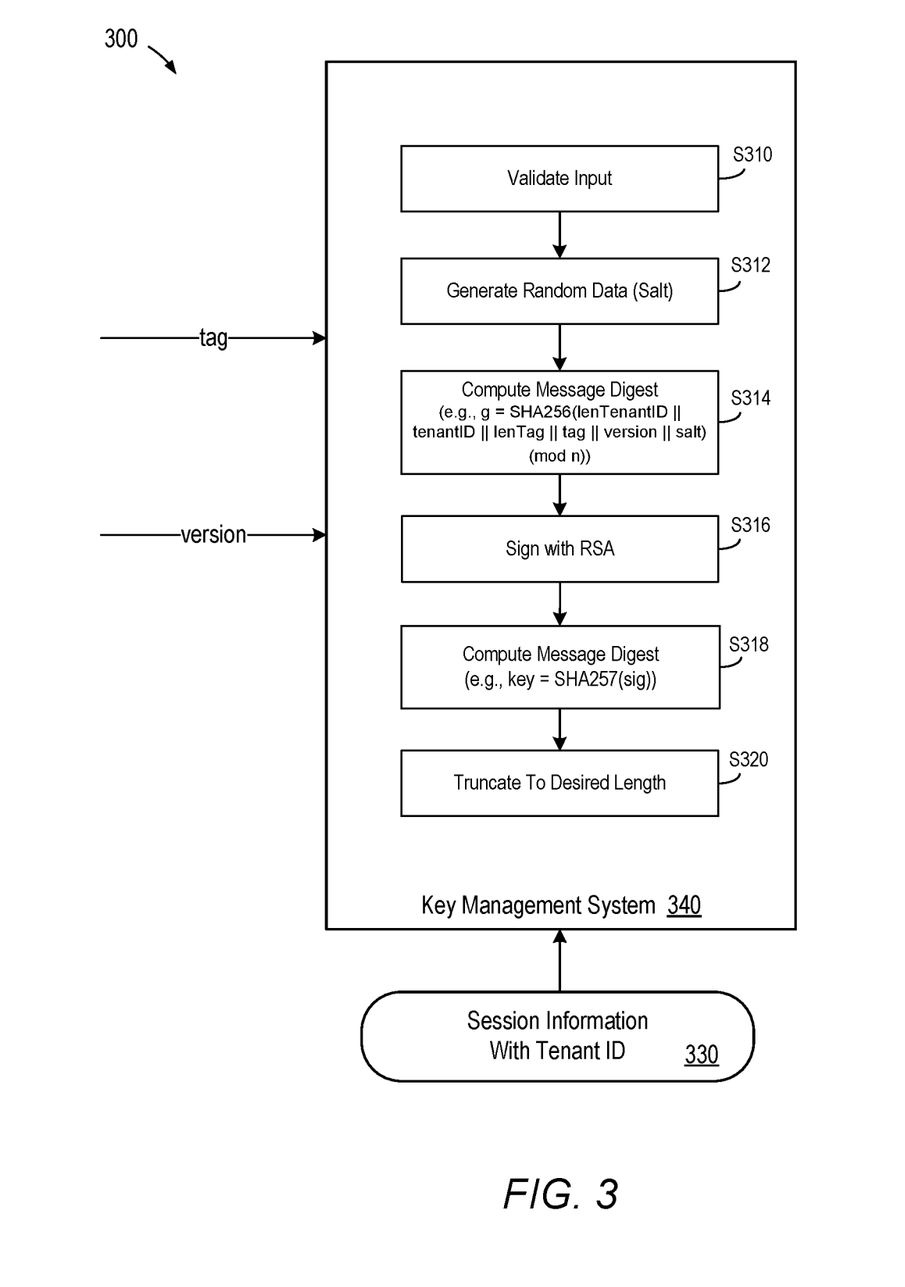
FIG. 3 is a diagram illustrating a use case according to some embodiments.

FIGS. 2 and 3 will be discussed together. FIG. 2 is a flow diagram illustrating an exemplary process 200 according to some embodiments. FIG. 3 is a diagram 300 illustrating a use case according to some embodiments.

In the lightweight KMS architecture according to the disclosed embodiments, all tenant keys (e.g., encryption keys for each tenant) are derived from a root key and a tenant identifier (e.g., company ID). The tenant identifier is immutable and unforgeable once a user session is established. Data security of the system relies on confidentiality of the root key and immutability of the tenant identifier. Tenant identifier immutability assures that one tenant cannot access another tenant's keys maliciously or by mistake.

The application programming interface (API) of this KMS architecture is modeled after the Key Management Interoperability Protocol (KMIP), which is a standard for key management governed by the Organization for the Advancement of Structured Information Standards (OASIS). Further details of the operations of the KMS will be described below.

Initially, at S210, a root key setup process is performed (e.g., by a cloud service provider) to generate a root key (one for each data center), for example, using the following system command:

keytool -genkeypair -keyalg "RSA" -keysize 2048 -keystore root.jks -alias root

The same root key is deployed on all application servers for all the tenants. This command generates a pair of 2048-bit Rivest-Shamir-Adleman (RSA) public/private keys (RSA keypair) and stores them in the keystore file named "root.jks". Preferably, this keystore file is backed up securely and is accessible only to the KMS/application server and not to other processes running on the system. The command will also prompt for a password that will be used to protect the keystore. This password must be provided in order to access the keystore (e.g., during server configuration).

Of note are the following parameters/values of the root keypair:

"n", the RSA modulus that is the product of two large prime numbers "p" and "q";
"e", the RSA public exponent; and
"d", the RSA private exponent.

In some embodiments, "p" and "q" may be 1024-bit or even 2048-bit prime numbers. Here, "d" and "e" denote a pair of matching public and private exponents, satisfying e*d=1 mod (p−1)*(q−1).

Next, at S220, a Create Tenant Key operation is performed to generate tenant-specific metadata, taking several input parameters and returning a symmetric key. The input parameters include one or more of a tenant identifier (ID), a key length, a key tag, and a refresh period.

The tenant ID ("tenantID") is an implicit input retrieved from session information (e.g., rather than an explicit input from the KMS client). The tenant ID may have different lengths. In an example embodiment, the tenant ID is less than 128 characters.

The key length ("keyLength") indicates the length of the key. In some embodiments, the key length is in bits, and is expressed as a multiple of eight (1 byte equals 8 bits) in the range of 128 to 256.

The key tag ("tag") indicates purpose of the key and is optional and may be omitted in certain embodiments. Some examples of key tags include "SessionToken", "Encryption", and "MessageDigest". The tag value may have different lengths. In an example embodiment, the tag value is less than 128 characters.

The refresh period ("refreshPeriod"), also optional and may be omitted in certain embodiments, indicates a predetermined period of time after which a key version is incremented (e.g., by one). In an example embodiment, the default value is 30 days.

More specifically, in one embodiment, the tenant-specific metadata is created as follows. First, the KMS verifies that the input tag has not already been used for a particular tenant (e.g., avoiding duplicates). If not provided by the input, the tag will be an empty string by default. Next, the current key version ("curKeyVersion") is set to zero. The curKeyVersion is the current version of a key, and versions higher than this value are invalid. Also, a status of the key is set. For example, the key status is set to "active" status meaning it can be used for encryption and decryption, and after key expiration is changed from "active" status to "archived" status.

The time when the current key version must increment ("refreshTime") is calculated by adding the refresh period to the current time (e.g., refreshTime=current time+refresh period).

One or more parameters including tag, keyLength, status, curKeyVersion, refreshTime, and refreshPeriod are stored in a database as metadata for the new key and are returned to the KMS client.

In some embodiments, an encryption module that uses the keys for encryption/decryption may enforce certain policies associated with the keys. For example, it may be enforced that all versions of an active key can be used for decryption, but only the latest version of the key (e.g., corresponding to curKeyVersion) can be used for encrypting new data.

A Tenant Rekey/Key Versioning operation is invoked, for example, when the current version of the key is about to expire per the associated refreshTime or is triggered by an administrative operation on a user interface, and operates as follows.

With the tag as the explicit input parameter and the tenant ID as implicit input parameter, the key version is updated by checking if tag exists and is still valid and active for the tenant, incrementing curKeyVersion associated with tag by one, recalculating the refreshTime=current time+refreshPeriod, and updating metadata with new (curKeyVersion, refreshTime). When the key version increments, it may be enforced that older versions of the keys are used only to decrypt old messages, not to encrypt new messages.

The lifecycle of cryptographic keys further includes the archival, destruction, and recovery of keys.

An Archive Tenant Key operation for archiving a key takes tag as input parameter and operates as follows. First, it is checked that the tag exists and is still active, then the tag is marked as archived in the metadata store. In some cases, keys may be archived indefinitely. In other cases, the key is destroyed.

A Destroy Tenant Key operation for destroying/deleting a key takes tag as the input parameter and operates as follows. First, it is checked that the key corresponding to tag exists and is still valid (e.g., not expired or destroyed) for the tenant, then the tag is marked as destroyed in the metadata store and all in-memory keys with this tag for the tenant are deleted. Destroyed keys cannot be recovered or used in any way. However, archived key can be recovered.

A Recover Tenant Key operation for recovering a key takes tag as input parameter and operates as follows. First, it is checked that the tag exists and is archived. The archived tag is marked as active in the metadata store, then the Tenant Rekey/Key Versioning process described above is invoked. An archived tenant key cannot be used for encrypting new data. However, after the tenant key is recovered from "archived" status, the key may be used for encrypting new data again.

The archive, destroy, and recover key operations all operate on the metadata.

Once the metadata of the keys for a tenant is created, a List Tenant Key(s) operation may be used to list all key metadata (e.g., tag, keyLength, status, curKeyVersion, refreshTime, refreshPeriod) for the current tenant. For purposes of illustration, List Tenant Key(s) operation may return the following table listing the metadata information related to a tenant (e.g., Company1):

| tenantID | tag | keyLength | Status | curKeyVersion | refreshTime | refreshPeriod |
|---|---|---|---|---|---|---|
| Company1 | SessionToken | 128 | Active | 0 | Thu, 31 Dec. 2017 23:59:59 UTC | 30 days |
| Company1 | Encryption | 256 | Active | 1 | Thu, 31 Dec. 2017 23:59:59 UTC | 30 days |
| Company1 | MessageDigest | 128 | archived | 2 | NULL | 30 days |

At S230, the actual key value, derived from the root key and the tenant identifier, is computed in a Get Tenant Key operation. FIG. 3 illustrates an example embodiment implementing the Get Tenant Key operation. In one embodiment, KMS 340 takes the key tag and key version (tag, version) as explicit input parameters and the tenant ID from session information 330 as an implicit input parameter, and performs the following to return the corresponding key value.

First, at S310, the input is validated. In one example, this involves checking if the tag exists and is still valid (e.g., not destroyed) for the tenant, getting the keyLength and cur- KeyVersion associated with tag, and verifying that version<=curKeyVersion holds true. This means the version is valid for the corresponding key (versions higher than curKeyVersion are invalid). If a key entry is found in-memory corresponding to (tag, version), return the key value is returned.

The length of the tenantID is computed in bytes as 1-byte integer lenTenantID. For example, lenTenantID for "Company1" is 8.

The length of the tag is computed in bytes as 1-byte integer lenTag. For example, lenTag for "Encryption" is 10.

Next, at S312, the KMS generates a random number ("salt") for the version (if not already generated) and stores (tag, version, salt) in metadata. This tracks all the random salts necessary to compute keys.

At S314, a first message digest "g" is computed where g=SHA256(lenTenantID||tenantID||lenTag||tag||version||salt) (mod n). In an example embodiment, the version is encoded as 2 bytes. Alternatively, the version can be encoded as a 4-byte integer. The function SHA256 produces a hash with 256 bits.

At S316, an RSA signature is computed by raising the message "g" to the RSA private exponent "d" modulo the public modulus "n" (e.g., sig=g^d (mod n)).

At S318, a second message digest is computed where key=SHA256(sig) and truncated at S320, to the desired length (keyLength). For example, if keyLength is 128 bits, the SHA246 output is truncated by half and returned to the KMS client as the final output (key value), which is stored in-memory (e.g., non-persistent storage).

In this way, tenant keys of the different tenants may be derived on-the-fly during runtime without storing confidential information in nonvolatile memory.

Figure 4:
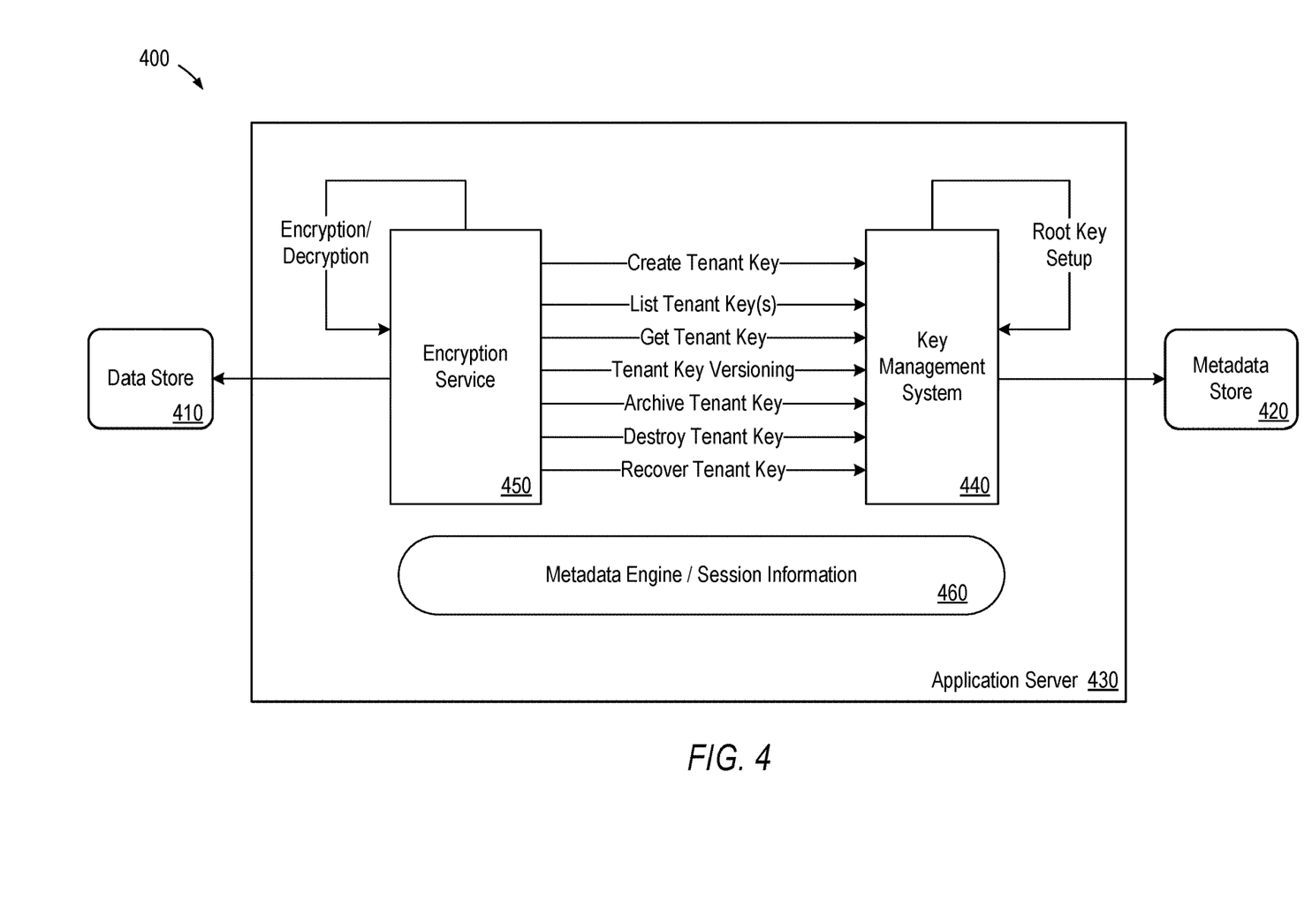
FIG. 4 is a block diagram showing functions of a key management system integrated within an application server of FIG. 1.
Figure 5:
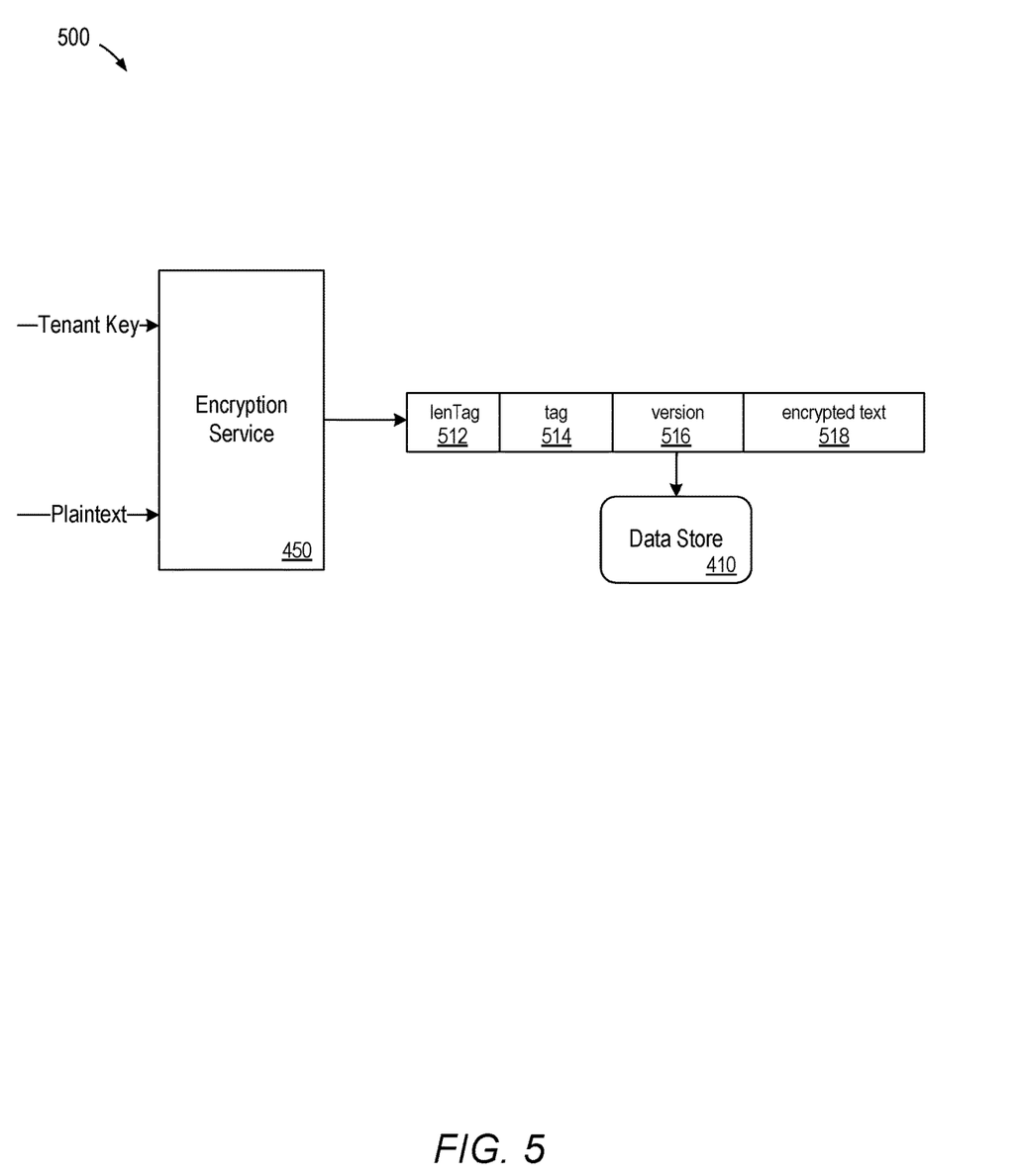
FIG. 5 is a diagram illustrating a use case according to some embodiments.

The key value may be used for cryptographic operations as described in FIGS. 4 and 5 below. FIG. 4 is a more detailed block diagram 400 of the system of FIG. 1, which illustrates an example embodiment integrating the lightweight KMS within an application server. Architecture 400 includes data store 410, application server 430, and KMS 440, which correspond, respectively, to data store 110, server 130, and KMS 140 in FIG. 1 and are generally as described above with respect to FIG. 1. Data store 410 stores data, application server 430 runs the business logic and makes sense of data, and KMS 440 manages the lifecycle of keys used in the system. Architecture 400 also includes metadata store 420, encryption service 450, and metadata engine with session information 460. KMS 440 handles the lifecycle of the keys and interacts with metadata store 420. Metadata store 420 stores and manages metadata that associates data with keys. Encryption service 450 interacts with KMS 440 by invoking the operations discussed above including: Create Tenant Key, List Tenant Key(s), Get Tenant Key, Tenant Key Versioning, Archive Tenant Key, Destroy Tenant Key, and Recover Tenant Key. Encryption service 450 uses keys maintained by KMS 440 and metadata from metadata store 420 to perform data encryption/decryption. Encrypted data is stored in and retrieved from data store 410. Session information 460 is maintained by application server 430 after user login. Among the most relevant session information 460 sent to KMS 440 is the tenant ID of the current logged-in user.

For encryption and decryption, metadata including the tag and the specific version used for encryption is maintained for use with lightweight KMS 440. In an example embodiment, for data store/encryption, encryption service 450 encrypts data (e.g., using AES encryption) to obtain encrypted text (ciphertext). With each ciphertext, metadata is stored together with the ciphertext. For example, the tag and version are concatenated with the ciphertext and (lenTag||tag||version||ciphertext) is stored in data store 410. This data format is illustrated in FIG. 5. In an example embodiment, lenTag 512 is 1 byte, tag 514 is of variable length, version 516 is 2 bytes, and ciphertext 518 is 16 bytes if AES (Advanced Encryption Standard) is used as the encryption scheme.

For data retrieval/decryption, encryption service 450 strips tag 514 and version 516 from the ciphertext 518, retrieves the tenant key corresponding to the specified tag 514 and version 516 (if not already in memory) from the KMS, and decrypts the data into plaintext.

Figure 6:
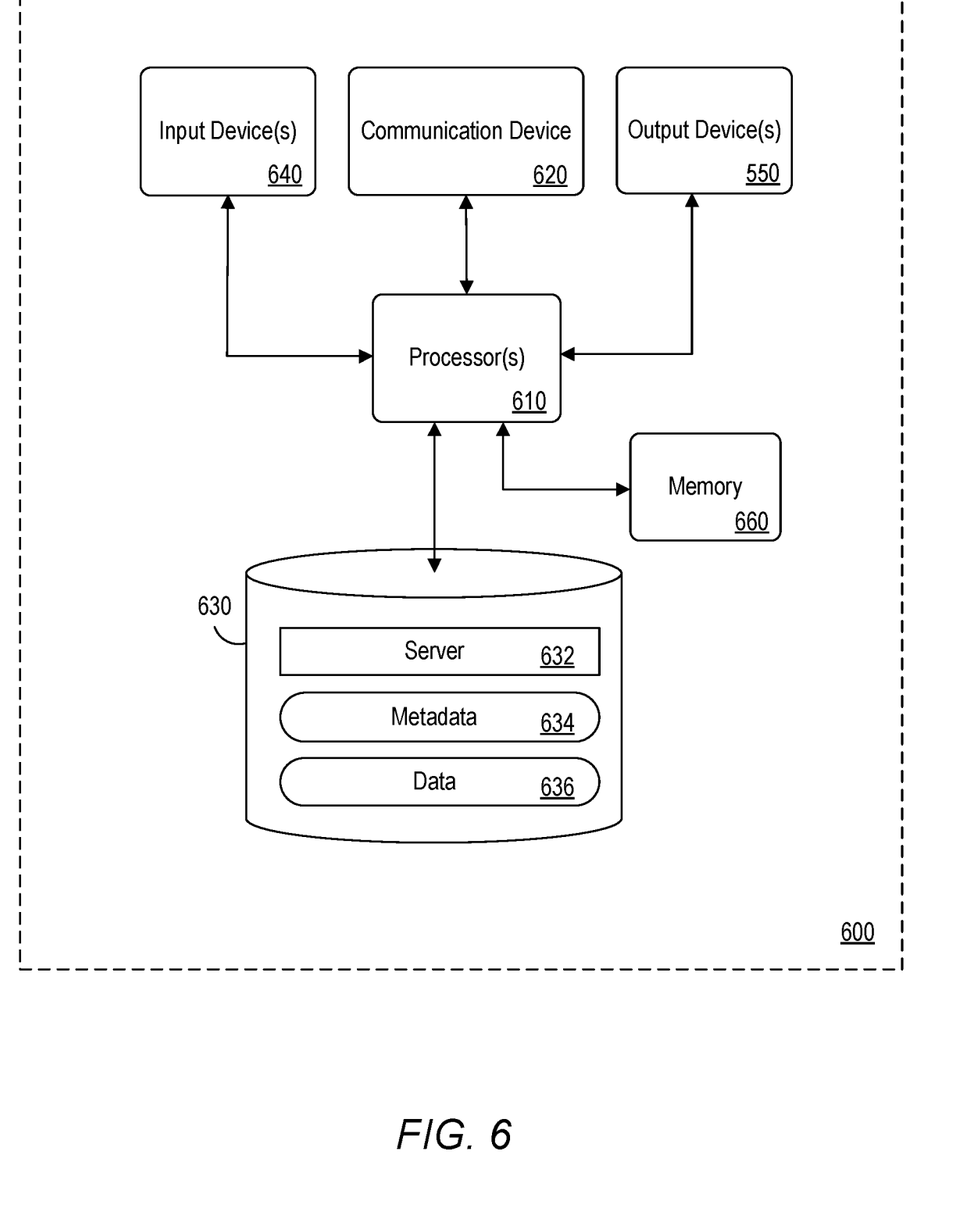
FIG. 6 is a block diagram of an apparatus according to some embodiments.

FIG. 6 is a block diagram of apparatus 600 according to some embodiments. Apparatus 600 may comprise a general- or special-purpose computing apparatus and may execute program code to perform any of the functions described herein. Apparatus 600 may comprise an implementation of one or more elements of architectures 100 and 400. Apparatus 600 may include other unshown elements according to some embodiments.

Apparatus 600 includes processor 610 operatively coupled to communication device 620, data storage device 630, one or more input devices 640, one or more output devices 650, and memory 660. Communication device 620 may facilitate communication with external devices, such as an application server 632. Input device(s) 640 may comprise, for example, a keyboard, a keypad, a mouse or other pointing device, a microphone, knob or a switch, an infra-red (IR) port, a docking station, and/or a touch screen. Input device(s) 640 may be used, for example, to manipulate graphical user interfaces and to input information into apparatus 600. Output device(s) 650 may comprise, for example, a display (e.g., a display screen), a speaker, and/or a printer.

Data storage device 630 may comprise any appropriate persistent storage device, including combinations of magnetic storage devices (e.g., magnetic tape, hard disk drives and flash memory), optical storage devices, Read Only Memory (ROM) devices, etc., while memory 660 may comprise Random Access Memory (RAM).

Application server 632 may comprise program code executed by processor 610 to cause apparatus 600 to perform any one or more of the processes described herein. Embodiments are not limited to execution of these processes by a single apparatus.

Metadata 634 and data 636 (either cached or a full database) may be stored in volatile memory such as memory 660. Data storage device 630 may also store data and other program code for providing additional functionality and/or which are necessary for operation of apparatus 600, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A method for key management, the method comprising:
   generating a root key pair including a public key and a private key;
   generating metadata for keys associated with a tenant, wherein the metadata includes a key tag, a key version, and a tenant identifier;
   deriving a tenant key from the root key pair and the metadata; and
   outputting the tenant key.

2. The method of claim 1, wherein the tenant identifier is immutable once a user session is established.

3. The method of claim 1, wherein the tenant key is derived on-the-fly during runtime.

4. The method of claim 1, wherein deriving the tenant key further comprises:
   validating input parameters including the tenant identifier, the key tag and the key version;
   determining a length of the tenant identifier;
   determining a length of the key tag;
   generating a random number for the key version;
   computing a first message digest based on a secure hash algorithm (SHA) using the input parameters, the length of the tenant identifier, the length of the key tag, and the random number for the key version;
   signing the first message digest with the private key to produce a digital signature;
   computing a second message digest using the digital signature; and
   truncating the second message digest to produce a key value of the tenant key.

5. The method of claim 1, further comprising performing data encryption using the tenant key, including:
   encrypting data using the tenant key to obtain encrypted data;
   determining a key tag and a key version associated with the tenant key;
   concatenating the key tag and the key version with the encrypted data; and
   storing the concatenation in a data store.

6. The method of claim 5, further comprising performing data decryption using the tenant key, including:
   removing the key tag and the key version from the encrypted data;
   retrieving the tenant key corresponding to the key tag and the key version; and
   decrypting the encrypted data to plaintext.

7. The method of claim 1, wherein the metadata includes a refresh period indicating a predetermined period of time after which the key version is incremented.

8. A system comprising:
   a processor; and
   a memory in communication with the processor, the memory storing program instructions, the processor operative with the program instructions to perform the operations of:
   generating a root key pair including a public key and a private key;
   generating metadata for keys associated with a tenant, wherein the metadata includes a key tag, a key version, and a tenant identifier that is immutable once a user session is established;
   deriving a tenant key from the root key pair and the metadata; and
   outputting the tenant key.

9. The system of claim 8, wherein the tenant key is derived on-the-fly during runtime.

10. The system of claim 8, wherein deriving the tenant key further comprises:
    validating input parameters including the tenant identifier, the key tag and the key version;
    determining a length of the tenant identifier;
    determining a length of the key tag;
    generating a random number for the key version;
    computing a first message digest based on a secure hash algorithm (SHA) using a concatenation of the input parameters, the length of the tenant identifier, the length of the key tag, and the random number for the key version;
    signing the first message digest with the private key to produce a digital signature;
    computing a second message digest using the digital signature; and
    truncating the second message digest to produce a key value of the tenant key.

11. The system of claim 8, further comprising performing data encryption using the tenant key, including:
    encrypting data using the tenant key to obtain encrypted data;
    determining a key tag and a key version associated with the tenant key;
    concatenating the key tag and the key version with the encrypted data; and
    storing the concatenation in a data store.

12. The system of claim 11, further comprising performing data decryption using the tenant key, including:
    removing the key tag and the key version from the encrypted data;
    retrieving the tenant key corresponding to the key tag and the key version; and
    decrypting the encrypted data to plaintext.

13. The system of claim 8, wherein the metadata includes a refresh period indicating a predetermined period of time after which the key version is incremented.

14. A non-transitory computer readable medium having stored therein instructions that when executed cause a computer to perform a method comprising:
    generating a root key pair including a public key and a private key;
    generating metadata for keys associated with a tenant, wherein the metadata includes a key tag, a key version, and a tenant identifier;
    deriving a tenant key from the root key pair and the metadata; and
    outputting the tenant key.

15. The non-transitory computer-readable medium of claim 14, wherein the tenant identifier is immutable once a user session is established.

16. The non-transitory computer-readable medium of claim 14, wherein the tenant key is derived on-the-fly during runtime.

17. The non-transitory computer-readable medium of claim 14, wherein deriving the tenant key further comprises:
  validating input parameters including the tenant identifier, the key tag and the key version;
  determining a length of the tenant identifier;
  determining a length of the key tag;
  generating a random number for the key version;
  computing a first message digest based on a secure hash algorithm (SHA) using the input parameters, the length of the tenant identifier, the length of the key tag, and the random number for the key version;
  signing the first message digest with the private key to produce a digital signature;
  computing a second message digest using the digital signature; and
  truncating the second message digest to produce a key value of the tenant key.

18. The non-transitory computer-readable medium of claim 14, further comprising performing data encryption using the tenant key, including:
  encrypting data using the tenant key to obtain encrypted data;
  determining a key tag and a key version associated with the tenant key;
  concatenating the key tag and the key version with the encrypted data; and
  storing the concatenation in a data store.

19. The non-transitory computer-readable medium of claim 18, further comprising performing data decryption using the tenant key, including:
  removing the key tag and the key version from the encrypted data;
  retrieving the tenant key corresponding to the key tag and the key version; and
  decrypting the encrypted data to plaintext.

20. The non-transitory computer-readable medium of claim 14, wherein the metadata includes a refresh period indicating a predetermined period of time after which the key version is incremented.

\* \* \* \* \*